(12) United States Patent
Umehara et al.

(10) Patent No.: US 9,150,396 B2
(45) Date of Patent: Oct. 6, 2015

(54) ELECTRIC-VEHICLE CONTROL DEVICE, AND ELECTRIC VEHICLE AND FORKLIFT TRUCK HAVING THE SAME

(75) Inventors: Ryuichi Umehara, Tokyo (JP); Osamu Nakakita, Tokyo (JP); Masataka Kawaguchi, Tokyo (JP); Toshiyuki Honda, Tokyo (JP); Wataru Mizunuma, Tokyo (JP)

(73) Assignee: MITSUBISHI NICHIYU FORKLIFT CO., LTD., Kyoto (JP)

( * ) Notice: Subject to any disclaimer, the term of this patent is extended or adjusted under 35 U.S.C. 154(b) by 291 days.

(21) Appl. No.: 13/498,397

(22) PCT Filed: Apr. 12, 2010

(86) PCT No.: PCT/JP2010/002642
§ 371 (c)(1),
(2), (4) Date: Mar. 27, 2012

(87) PCT Pub. No.: WO2011/039901
PCT Pub. Date: Apr. 7, 2011

(65) Prior Publication Data
US 2012/0185121 A1 Jul. 19, 2012

(30) Foreign Application Priority Data
Sep. 30, 2009 (JP) ................. P2009-228331

(51) Int. Cl.
*B60K 1/00* (2006.01)
*B66F 9/24* (2006.01)
(Continued)

(52) U.S. Cl.
CPC . *B66F 9/24* (2013.01); *B60L 15/20* (2013.01); *H02P 29/0038* (2013.01); *Y02T 10/642* (2013.01); *Y02T 10/7275* (2013.01)

(58) Field of Classification Search
CPC . B60L 15/20; B60L 2200/42; B66F 9/07559; B66F 9/24

USPC ...................................... 701/22, 99
See application file for complete search history.

(56) References Cited

U.S. PATENT DOCUMENTS 7,333,882 B2 * 2/2008 Uchino et al. .................. 701/37
2005/0253543 A1 * 11/2005 Soudier et al. ................ 318/432
(Continued)

FOREIGN PATENT DOCUMENTS

AU 2009243480 A1 * 7/2010
EP 1764254 A1 * 3/2007
(Continued)

OTHER PUBLICATIONS

Machine Translation—Date of Translation Mar. 5, 2014 Yamaguchi et al., Speed Command Control Unit and Speed Controller for Electrically-Propelled Vehicle, Japanese Patent Office, JP 3935039 B2, Jun. 20, 2007.*
(Continued)

*Primary Examiner* — John Q Nguyen
*Assistant Examiner* — Nadeem Odeh
(74) *Attorney, Agent, or Firm* — Birch, Stewart, Kolasch & Birch, LLP

(57) ABSTRACT

The electric-vehicle control device is used in an electric vehicle which is provided with a vehicle body having a driving tire and an axle shaft and with a driving motor which imparts torque to the driving tire. The electric-vehicle control device issues a motor control command to the driving motor. The electric-vehicle control device is provided with a control unit, and the control unit gives feedback control to the driving motor by vibration parameters indicating vertical vibration of the electric vehicle at the center of the axle shaft.

19 Claims, 5 Drawing Sheets

(51) Int. Cl.
*B60L 15/20* (2006.01)
*H02P 29/00* (2006.01)

(56) References Cited

U.S. PATENT DOCUMENTS

2009/0058346 A1* 3/2009 Marushita et al. ............ 318/611
2010/0094495 A1 4/2010 Fujimoto et al.

FOREIGN PATENT DOCUMENTS

| JP | 61-224803 A | | 10/1986 |
|----|----|----|----|
| JP | 62-7384 A | | 1/1987 |
| JP | 4-340369 A | | 11/1992 |
| JP | 44 35 775 A1 | | 4/1996 |
| JP | 11-312600 A | | 11/1999 |
| JP | 2000-257706 A | | 9/2000 |
| JP | 2001289090 A | * | 10/2001 |
| JP | 2003-222186 A | | 8/2003 |
| JP | 2004-147491 A | | 5/2004 |
| JP | 2005-349885 A | | 12/2005 |
| JP | 2006-237711 A | | 9/2006 |
| JP | 2007-110879 A | | 4/2007 |
| JP | 3935039 B2 | | 6/2007 |
| JP | 2007-261477 A | | 10/2007 |
| JP | 2007261477 A | * | 10/2007 |
| JP | 2008-167612 A | | 7/2008 |
| JP | 101213104 A | | 7/2008 |
| JP | 2010-81684 A | | 4/2010 |
| JP | 102745197 A | | 10/2012 |
| WO | WO 2008/111436 A1 | | 4/2007 |
| WO | WO 2008/006928 A1 | | 1/2008 |

OTHER PUBLICATIONS

Machine Translation—Date of Translation Feb. 25, 2014 Nishino et al., Drive System of Electric Vehicle, Japanese Patent Office, JP 2007110879 A, Apr. 26, 2007.*
Wikipedia, Active Vibration Control, Dec. 15, 2005 (http://en.wikipedia.org/wiki/Active_vibration_control).*
Herzan, Active Vibration Control, Jul. 18, 2011, Herzan LLC (http://www.herzan.com/resources/technology/active-vibration-control.html).*
Machine Translation, Maeda et al., JP 2007261477 A, Oct. 2007, Japanese Patent Publication.*
Machine Translation: Yamada, Torque Fluctuation Reducing Device, Japanese Publication JP 2001289090 A, Oct. 19, 2001.*
Japanese Office Action for corresponding JP Application No. 2009-228331 mailed Oct. 16, 2012, with an English translation.
Chinese Office Action mailed Nov. 5, 2013 for related application No. 201080043323.9 with English translation of the search report.
International Search Report for PCT/JP2010/002642 dated Jul. 13, 2010.
Sato et al., "Pitching Control Method of Electric Vehicle with Driving Force and Regenerative Brake of Motors on Deceleration".
Written Opionion ot the International Searching Authority for PCT/JP2010/002642 dated Jul. 13, 2010.

* cited by examiner

ELECTRIC-VEHICLE CONTROL DEVICE, AND ELECTRIC VEHICLE AND FORKLIFT TRUCK HAVING THE SAME

TECHNICAL FIELD

The present invention relates to an electric-vehicle control device, and an electric vehicle and a forklift truck having the electric-vehicle control device.

The present application claims priority based on patent application 2009-228331, filed in Japan on Sep. 30, 2009, the content of which is incorporated herein by reference.

BACKGROUND ART

In the above-described electric vehicle, pitching vibration which moves up and down in the longitudinal direction of a vehicle body not only gives discomfort to an operator but also affects control of the vehicle body. In particular, a forklift truck for carrying cargo undergoes a change in the position of the center of gravity of the vehicle in its entirety on placing the cargo and easily causes pitching vibration. Thereby, the operator feels discomfort or the cargo collapses to result in lower workability.

For example, Patent Document 1 shown below discloses a vehicle-body control device for an electric vehicle which takes pitching vibration into account. That is, the vehicle-body control device is provided with an accelerator input processing unit which issues a speed command (motor rotation number command) depending on a depression amount of an accelerator of the electric vehicle, a pitching detection unit which detects generation of pitching vibration on the basis of detected speed which is an actual rotational speed of a motor, and a speed command adjusting unit which outputs externally the speed command issued by the accelerator input processing unit when the pitching detection unit does not detect pitching vibration but searches for a speed command which is half the value of a sum of a maximum detected speed and a minimum detected speed at the time of development of pitching vibration and outputs the speed command externally, in place of the speed command issued by the accelerator input processing unit, when the pitching detection unit detects pitching vibration.

Patent Document 1: Japanese Patent No. 3935039

DISCLOSURE OF INVENTION

Problem to be Solved by the Invention

However, in conventional technologies, pitching vibration is reduced by decreasing the speed command. Therefore, there is a problem that pitching vibration is not damped positively but damped naturally to result in a lower vibration damping rate.

Further, since the speed command is decreased, there has been a separate problem of poor acceleration capability.

The present invention has been made in view of the above situation, an object of which is to provide an electric-vehicle control device which is high in vibration damping rate and retains the acceleration capability as well as an electric vehicle and a forklift truck having the electric-vehicle control device.

Means for Solving the Problem

In order to achieve the above-described object, the present invention has adopted the following means.

That is, the electric-vehicle control device according to the present invention is an electric-vehicle control device which is used in an electric vehicle which is provided with a vehicle body having a driving tire and an axle shaft and with a driving motor which imparts torque to the driving tire and in which a motor control command is issued to the driving motor. The electric-vehicle control device is provided with a control unit which gives feedback control to the driving motor by vibration parameters indicating vertical vibration of the electric vehicle at the center of the axle shaft.

The electric-vehicle control device according to the present invention may additionally be provided with a vibration control unit which generates a vibration control command to be added to the motor control command from the vibration parameters.

In the electric-vehicle control device according to the present invention, the vibration control unit may be provided with a filter to which kinetic parameters of the electric vehicle including the vibration parameters are input, and the filter may be that in which a controlled frequency band is set on the basis of a frequency of the vertical vibration to detect the vibration parameters from the input kinetic parameters.

In the electric-vehicle control device according to the present invention, the kinetic parameters are acceleration data of the electric vehicle, and the vibration control unit may be that in which the filter is used to give phase adjustment to the acceleration data of the controlled frequency band, thereby obtaining speed data which serves as the vibration parameters.

In the electric-vehicle control device according to the present invention, the vibration control unit may additionally be provided with a time delay unit which gives phase adjustment for output of the filter time-delayed.

In the electric-vehicle control device according to the present invention, the vibration control unit may be that in which the controlled frequency band is changed by static loads acting on the electric vehicle.

In the electric-vehicle control device according to the present invention, the vibration control unit may additionally be provided with an amplification unit which changes a gain coefficient with respect to the vibration parameters by static loads acting on the electric vehicle.

The electric-vehicle control device according to the present invention may additionally be provided with a dead zone element which allows the vibration control command to pass through on the condition that the vibration control command is equal to or greater than a predetermined threshold value.

The electric-vehicle control device according to the present invention may additionally be provided with a torque limiter unit having an extra torque computing unit which determines extra torque of the driving motor and a limiter in which a negative value of the extra torque, that is, a computation result of the extra torque computing unit, is set as a permissible minimum value to cut off a vibration control command less than the permissible minimum value, of the vibration control command.

The electric-vehicle control device according to the present invention may additionally be provided with a load determination unit which allows the vibration control command to pass through on the condition that static loads acting on the electric vehicle are equal to or greater than a predetermined threshold value.

The electric-vehicle control device according to the present invention may additionally be provided with a vehicle speed determination unit which allows the vibration control command to pass through on the condition that the vehicle speed of the electric vehicle is equal to or greater than a predetermined threshold value.

The electric-vehicle control device according to the present invention may additionally be provided with a turning determination unit which allows the vibration control command to pass through on the condition that a turning amount of the electric vehicle is less than a predetermined threshold value.

The electric-vehicle control device according to the present invention may additionally be provided with an unstable component eliminating filter which eliminates a control unstable frequency of the vibration control command.

The electric-vehicle control device according to the present invention may additionally be provided with a phase adjusting unit at a feedback loop based on the rotation number of the driving motor.

The electric vehicle according to the present invention is provided with a vehicle body having a driving tire and an axle shaft, a driving motor which imparts torque to the driving tire, and any one of the above-described electric-vehicle control devices.

The forklift truck according to the present invention is provided with a vehicle body having a driving tire and an axle shaft, a driving motor which imparts torque to the driving tire, a lift, and any one of the above-described electric-vehicle control devices.

In the forklift truck according to the present invention, the kinetic parameters are acceleration data of the electric vehicle and lift pressure acting on the lift is input to the filter as the acceleration data.

Effect of the Invention

According to the present invention, it is possible to obtain a high vibration damping rate and also maintain acceleration capabilities.

BEST MODE FOR CARRYING OUT THE INVENTION

Hereinafter, an explanation will be made for the present invention by referring to specific embodiments. Those skilled in the art will be able to obtain a variety of different embodiments on the basis of the description of the present invention, and the present invention shall not be restricted to the embodiments illustrated herein for explanation.

First Embodiment

Figure 1:
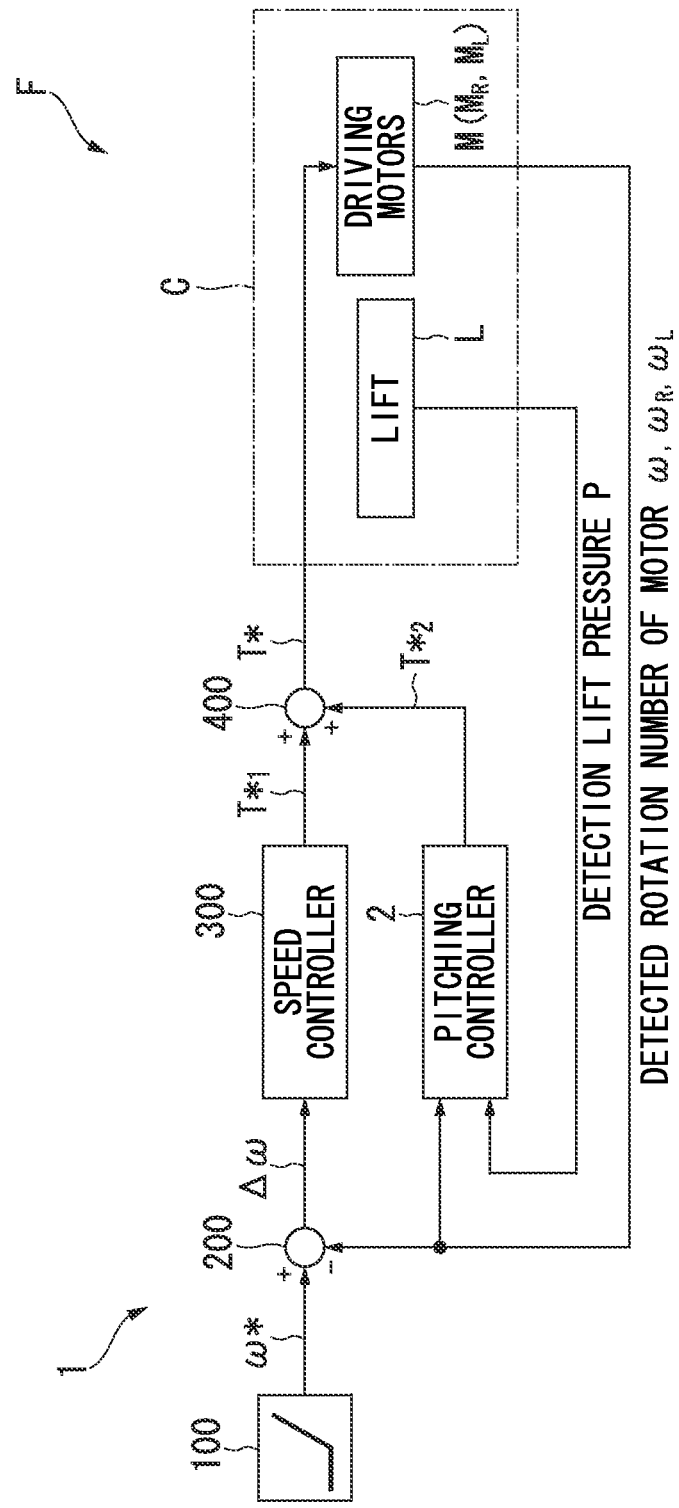
FIG. 1 is a block diagram which shows a brief constitution of an electric-vehicle control device 1 of a forklift truck (electric vehicle) F according to a first embodiment of the present invention.

FIG. 1 is a block diagram which shows a brief constitution of the electric-vehicle control device 1 of the forklift truck (electric vehicle) F according to the first embodiment of the present invention.

In the forklift truck F, a vehicle main body C is provided with a vehicle body having two driving tires mounted on the front axle shaft and two driven tires mounted on the rear axle shaft, two driving motors M ($M_R$, $M_L$) which impart rotational torque respectively to the two driving tires, and a lift L capable of hoisting cargo. The vehicle main body C is controlled for travel by the electric-vehicle control device 1.

As shown in FIG. 1, the electric-vehicle control device 1 is provided with an accelerator input processing unit 100, a first accumulator 200, a speed controller 300, a second accumulator 400, and a pitching controller (vibration control unit) 2.

The accelerator input processing unit 100 outputs a motor rotation number command $\omega^*$ to the first accumulator 200, depending on a depression amount of an accelerator.

The first accumulator 200 determines a deviation $\Delta\omega$ by subtracting the detected rotation number of a motor co detected from the driving motors M ($M_R$, $M_L$) (½ of a sum of the detected rotation number of a motor $\omega_R$ of the driving motor $M_R$ and the detected rotation number of a motor $\omega_L$ of the driving motor $M_L$) from the motor rotation number command $\omega^*$, thereby outputting the deviation $\Delta\omega$ to the speed controller 300.

The speed controller 300 performs PI computation to the deviation $\Delta\omega$ input from the first accumulator 200 to generate a motor control torque command (motor control command) $T^*_1$, thereby outputting the motor control torque command $T^*_1$ to the second accumulator 400.

Further, information on distribution of the motor rotation number which indicates a percentage of the detected rotation number of a motor $\omega_R$ and a percentage of the detected rotation number of a motor $\omega_L$, of the detected rotation number of a motor $\omega$, is to be separately input to the speed controller 300. Then, the speed controller 300 outputs information on distribution of the motor rotation number which indicates a percentage of a portion input to the driving motor $M_R$ to a portion input to the driving motor $M_L$, of the motor control torque command $T^*_1$, depending on the input information on distribution of the motor rotation number and a handle operating angle. Then, the driving motors $M_R$, $M_L$ are to be driven in accordance with the percentage (driven at the same percentage when the forklift truck moves straight ahead).

The detected rotation number of a motor $\omega$ ($\omega_R$, $\omega_L$) detected from the driving motors M ($M_R$, $M_L$) and detection lift pressure (kinetic parameters and acceleration data) P detected from the lift L are to be input to the pitching controller 2. The pitching controller 2 generates a pitching control torque command (vibration control command) $T^*_2$ from the detected rotation number of a motor $\omega$ ($\omega_R$, $\omega_L$) and the detection lift pressure P, thereby outputting the pitching control torque command $T^*_2$ to the second accumulator 400.

The pitching controller 2 will be explained later in detail.

The second accumulator 400 adds the motor control torque command $T^*_1$ to the pitching control torque command $T^*_2$ and outputs the added result to the driving motors M ($M_R$, $M_L$) as a torque command (motor control command) T*.

Where output of the pitching control torque command $T^*_2$ is zero, the motor control torque command $T^*_1$ is output to the driving motors M ($M_R$, $M_L$) as the torque command $T^*$.

Figure 2:
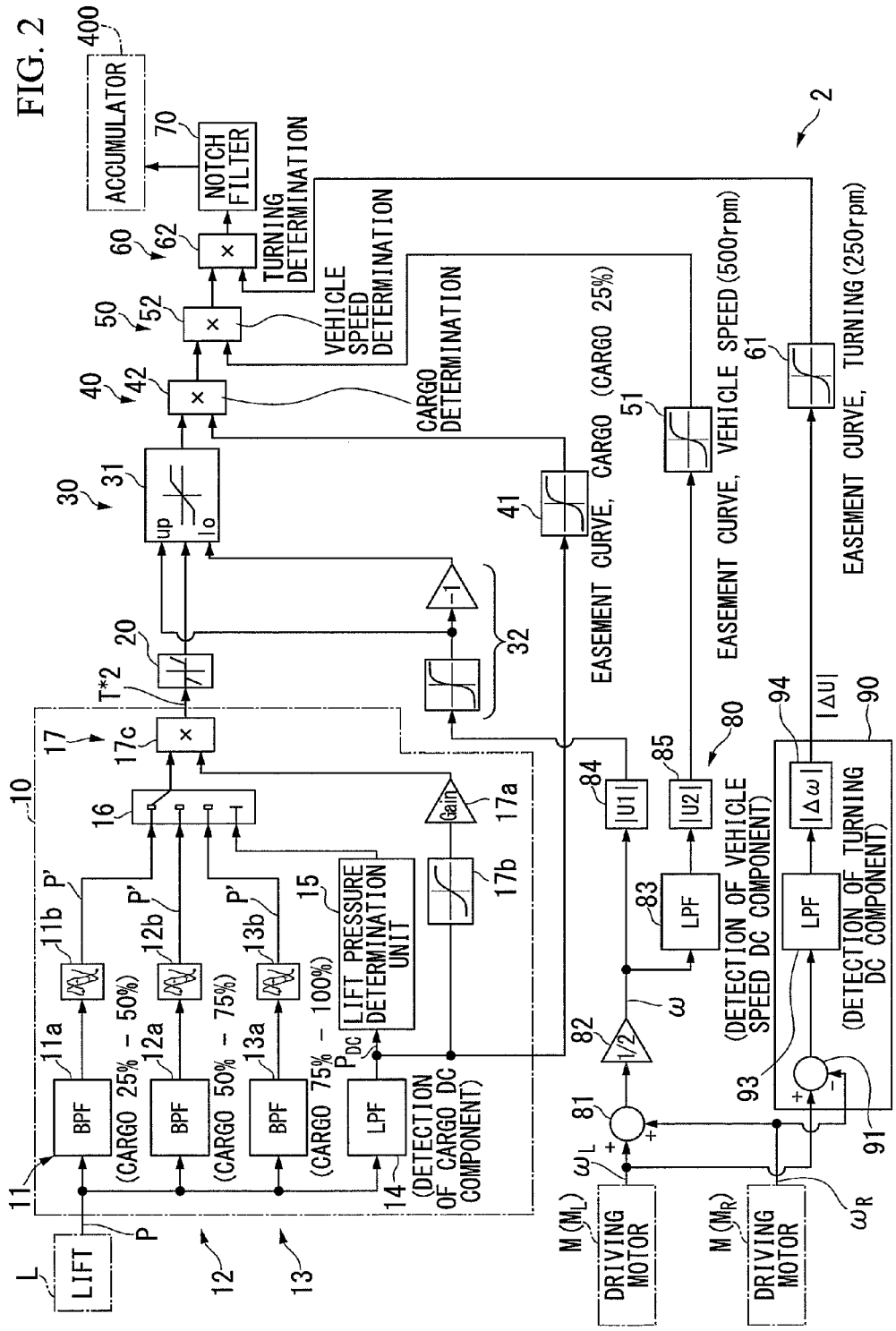
FIG. 2 is a block diagram which shows a detailed constitution of a pitching controller 2 in relation to the first embodiment of the present invention.

FIG. 2 is a block diagram which shows a detailed constitution of the pitching controller 2.

The pitching controller 2 is provided with a vibration control unit 10, a dead zone element 20, a torque limiter unit 30, a load determination unit 40, a vehicle speed determination unit 50, a turning determination unit 60, a notch filter (unstable component eliminating filter) 70, a vehicle-speed computing unit 80 which outputs vehicle-speed absolute values |U|(|U1|,|U2|), and a turning amount computing unit 90 which outputs a turning amount |ΔU|.

The vibration control unit 10 is provided with three phase adjusting units 11-13, a low-pass filter (LPF) 14 which detects a static component $P_{DC}$ of the detection lift pressure P, a lift pressure determination unit 15 which determines a magnitude of the static component $P_{DC}$ of the detection lift pressure P in three stages, a selection unit 16 which selects any one of the three phase adjusting units 11-13 depending on the determination result of the lift pressure determination unit 15, and an amplification unit 17 by which a gain coefficient that amplifies an output value of the selection unit 16 is set so as to vary.

The phase adjusting units 11-13 are to give phase adjustment to a predetermined controlled frequency band, of the detection lift pressure P indicated as acceleration data, thereby generating detection lift pressure P' indicated as speed data. Each of the phase adjusting units 11-13 is provided with each set of BPFs (filters 11a-13a) and time delay means (11b-13b).

The band pass filters (BPFs) 11a-13a have mutually different controlled frequency bands. Each of these controlled frequency bands has a unique frequency of pitching vibration which varies depending on static loads acting on the lift L. Specifically, pitching vibration is assumed to be pitching vibration at the center of a drive wheel mounted on the front axle shaft. More specifically, a unique frequency of 4.5 Hz upon action of static loads which are 25-50% of maximum static loads of the lift L is set at the controlled frequency band of the BPF 11a. A unique frequency of 3.5 Hz upon action of static loads which are 50-75% of maximum static loads is set at the controlled frequency band of the BPF 11b. A unique frequency of 2.5 Hz upon action of static loads which are 75-100% of maximum static loads is set at the controlled frequency band of the BPF 11c.

These BPFs 11a-13a are increased in gain so that the input detection lift pressure P reacts only to each of the controlled frequency bands and constituted so that the input detection lift pressure P does not react at low frequencies or high frequencies other than the controlled frequency bands. Further, with consideration given to delay of the electric-vehicle control device 1 as a whole, a phase of the detection lift pressure P at each controlled frequency band is set so as to be delayed at 90 degrees.

Figure 3:
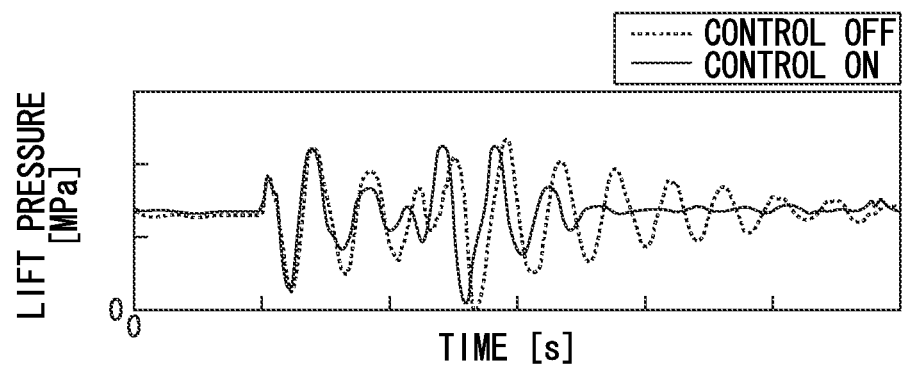
FIG. 3 is a graph which shows a relationship between detected lift pressure P and time according to the first embodiment of the present invention.

That is, where pitching vibration takes place, in association with pitching vibration due to cargo on the lift L undergoing vibration to change the lift pressure, as shown in FIG. 3, a wave pattern of the detection lift pressure P appears as a wave pattern of acceleration of pitching vibration. In fact, the BPFs 11a-13a are to give velocity feedback to acceleration data indicated by the detection lift pressure P, with speed data obtained by phase adjustment given as vibration parameters, and the filters are designed on the basis of the skyhook control theory.

The time delay means 11b-13b are provided as auxiliary means, with a case where the detection lift pressure P not sufficiently subjected to phase adjustment by the BPFs 11a-13a is taken into account. The time delay means 11b-13b give phase adjustment by time delay to the detection lift pressure P' which has passed through the BPFs 11a-13a.

The LPF 14 is set so as to output only a static component $P_{DC}$ (load DC component), among dynamic components and static components of the detection lift pressure P. In other words, the LPF 14 detects only the static loads of cargo placed on the lift L.

The lift pressure determination unit 15 determines which load range the static component $P_{DC}$ that has passed through the LPF 14 falls under, that is, 25-50%, 50-75% or 75-100% of maximum static loads acting on the lift L.

The selection unit 16 is constituted so as to select any one of the phase adjusting units 11-13 on the basis of the determination result of the lift pressure determination unit 15. Specifically, on the basis of a load range determined by the lift pressure determination unit 15, any one of the phase adjusting units 11-13 (filters 11a-13a) to which a controlled frequency band corresponding to the load range concerned is set is selected. For example, where the lift pressure determination unit 15 determines that a static component $P_{DC}$ of the detection lift pressure P is in the load range of 50-75% of the maximum static loads, on the basis of this determination result, the phase adjusting unit 12 (filter 12) to which the unique frequency of 3.5 Hz upon action of static loads which are 50-75% of the maximum static loads is set is selected.

The selection unit 16 outputs the detection lift pressure P' input from any one of the phase adjusting units 11-13 to the amplification unit 17.

The amplification unit 17 amplifies the detection lift pressure P' output from the selection unit 16, generates a pitching control torque command $T^*_2$ and outputs the pitching control torque command $T^*_2$ to the dead zone element 20. The amplification unit 17 is provided with an amplifier 17a, a gain coefficient correction unit 17b and a multiplier 17c.

The amplifier 17a is given a gain coefficient which is an appropriate value in magnitude so that control is not unstable.

The gain coefficient correction unit 17b is to correct a gain coefficient set at the amplifier 17a. That is, even if acceleration is the same, there is a difference in variable components (dynamic components) of lift pressure, depending on static loads of cargo placed on the lift L. Therefore, in search of an optimal gain coefficient corresponding to a static component $P_{DC}$ of the detection lift pressure P, the gain coefficient correction unit 17b corrects a gain coefficient of the amplifier 17a so as to attain an optimal gain coefficient.

A value of the optimal gain coefficient corresponding to the static component $P_{DC}$ is to be determined by allowing a previously generated static component $P_{DC}$ to correspond to the gain coefficient.

The multiplier 17c multiplies the detection lift pressure P' with a gain coefficient set in the amplifier 17a.

The dead zone element 20 allows the pitching control torque command $T^*_2$ to pass through where amplitude of the input pitching control torque command $T^*_2$ is equal to or greater than a threshold value T'. On the other hand, where the amplitude of the input pitching control torque command $T^*_2$ is less than the threshold value T', the dead zone element 20 cuts off the pitching control torque command $T^*_2$.

The threshold value T' of the dead zone element 20 may be made constant, irrespective of the detected rotation number of a motor ω, or may be made variable depending on the detected rotation number of a motor ω. For example, such a constitution can be conceivable in which, in search of maximum torque at the rotation number (ω) of each motor in advance, the maximum torque is allowed to correspond to the rotation number (ω) of each motor, and the maximum toque is obtained on the basis of this correspondence and the detected rotation number of a motor ω, thereby a predetermined percentage of the maximum torque is used as the threshold value T'.

The torque limiter unit 30 is to restrict the amplitude of the pitching control torque command $T^*_2$ to a predetermined range and provided with a limiter 31 and extra torque computing means 32.

The limiter 31 is provided with a permissible maximum value up and a permissible minimum value lo of the pitching control torque command $T^*_2$ and cuts off a value exceeding the permissible maximum value up and a value lower than the permissible minimum value lo, of the pitching control torque command $T^*_2$ input from the dead zone element 20.

The extra torque computing means 32 is to determine extra torque by subtracting currently outputting torque from maximum torque of the driving motors M ($M_R$, $M_L$) which can be output. The extra torque is determined by obtaining the maximum torque which can be output at that point in time from a currently available vehicle-speed absolute value |U1| by referring to a characteristic diagram of the driving motors M ($M_R$, $M_L$) and subtracting a value of the currently outputting motor traveling torque from the maximum torque.

The thus determined extra torque is that in which a positive value thereof is set as a permissible maximum value up of the limiter 31 and a negative value thereof is set as a permissible minimum value lo thereof.

The load determination unit 40 outputs the pitching control torque command $T^*_2$ to the vehicle speed determination unit 50 on the condition that a static component $P_{DC}$ of the detection lift pressure P input from the LPF 14 is equal to or greater than 25% of maximum static loads of the lift L.

More specifically, by referring to a load variable map indicating a relationship between a static component $P_{DC}$ and a variable d1 (0-1) of the multiplier 42, the load variable deciding means 41 determines the variable d1 from the input static component $P_{DC}$, and the multiplier 42 multiplies the determined variable d1 with the pitching control torque command $T^*_2$.

That is, where the static component $P_{DC}$ is equal to or greater than 25% of the maximum static loads, the pitching control torque command $T^*_2$ which is multiplied by the variable d1 is output to the vehicle speed determination unit 50. Where the static component $P_{DC}$ is sufficiently greater than 25% of the maximum static loads, the pitching control torque command $T^*_2$ equal in multiplication (d1=1) to the magnitude at the time of input is output, and where the static component $P_{DC}$ is slightly greater than 25% of the maximum static loads, the pitching control torque command $T^*_2$ which is multiplied by the variable d1 (0<d1<1) is output.

The vehicle speed determination unit 50 is to output the pitching control torque command $T^*_2$ to the turning determination unit 60 on the condition that a DC component of the detected rotation number of a motor o is equal to or greater than a predetermined threshold value and provided with vehicle speed variable deciding means 51 and a multiplier 52. A threshold value is set to be, for example, 500 rpm of the motor rotation number which may easily cause pitching vibration.

More specifically, by referring to a vehicle speed variable map (easement curve) which indicates a relationship between a static component $P_{DC}$ and a variable d2 (0-1), the vehicle speed variable deciding means 51 determines the variable d2 from the input static component $P_{DC}$, and the multiplier 52 multiplies the thus determined variable d2 with the pitching control torque command $T^*_2$.

The turning determination unit 60 outputs the pitching control torque command $T^*_2$ to the notch filter 70 on the condition that a turning absolute value |ΔU| of a static component (value from which variation noise resulting from pitching vibration and so on, is eliminated) of a deviation Δω between the detected rotation number of a motor $ω_R$, $ω_h$, of the driving motors $M_R$, $M_L$, is equal to or greater than a predetermined threshold value. The turning determination unit 60 is provided with turning variable deciding means 61 and a multiplier 62. A threshold value is set to be 250 rpm, for example.

More specifically, by referring to a turning variable map (easement curve) which indicates a relationship between a static component $P_{DC}$ and a variable d3 (0-1), the turning variable deciding means 61 determines the variable d3 from the input static component $P_{DC}$, and the multiplier 62 multiplies the thus determined variable d3 with the pitching control torque command $T^*_2$.

The notch filter 70 is to eliminate a control unstable frequency where the pitching control torque command $T^*_2$ is changed into a wave pattern of the control unstable frequency. That is, where in the dead zone element 20 and the torque limiter unit 30, a wave pattern of the pitching control torque command $T^*_2$ assumes an acute angle to generate a wave pattern of the control unstable frequency, the wave pattern becomes smooth.

The notch filter 70 gives the above processing to the input pitching control torque command $T^*_2$ and outputs the pitching control torque command $T^*_2$ to the second accumulator 400.

The vehicle speed computing unit 80 is provided with an accumulator 81, an amplifier 82, an LPF 83 and absolute value circuits 84, 85. Then, the vehicle speed computing unit 80 adds the detected rotation number of a motor $ω_R$, $ω_L$, by the accumulator 81, halves the added value by the gain 81, determines an absolute value of the output value by the absolute value circuit 84 and outputs the thus determined vehicle-speed absolute value |U1| to the torque limiter unit 30.

Further, after determining a vehicle speed DC component (value from which variation noise resulting from pitching vibration, and so on, is eliminated) by allowing an output value of the amplifier 82 to pass through the LPF 83, the vehicle speed computing unit 80 determines an absolute value of the output value by the absolute value circuit 85 and outputs the determined vehicle-speed absolute value |U2| to the vehicle speed determination unit 50.

The turning amount computing unit 90 is provided with an accumulator 91, an LPF 93 and an absolute value circuit 94. The turning amount computing unit 90 computes a difference between the detected rotation number of a motor $ω_R$, $ω_L$, by the accumulator 91, determines a turning DC component $Δω_{DC}$ (value from which variation noise resulting from pitching vibration, and so on, is eliminated) by allowing the difference to pass through the LPF 93 and, thereafter, determines an absolute value of the output value by the absolute value circuit 94, thereby outputting the determined turning absolute value |ΔU| to the turning determination unit 60.

Next, an explanation will be made for actions of the above-constituted pitching controller 2 by referring to the drawings.

First, upon depression of the accelerator of the vehicle main body C, as shown in FIG. 1, the accelerator input processing unit 100 outputs a motor rotation number command ω* depending on a depression amount of the accelerator.

The first accumulator 200 subtracts the detected rotation number of a motor ω detected from the driving motors M ($M_R$, $M_L$) from the motor rotation number command ω* input from the accelerator input processing unit 100, thereby outputting the deviation Δω to the speed controller 300.

The speed controller 300 performs PI computation to the deviation Δω input from the first accumulator 200, thereby outputting the motor control torque command $T^*_1$ to the second accumulator 400.

The second accumulator 400 outputs as a torque command $T^*$ an added result of the motor control torque command $T^*_1$ input from the speed controller 300 and the pitching control torque command $T^*_2$ input from the pitching controller 2 to the driving motors M ($M_R$, $M_L$).

On the other hand, at the vehicle main body C, the detected rotation number of a motor ω ($ω_R$, $ω_L$) is output from the driving motors M ($M_R$, $M_L$) to the first accumulator 200 and the pitching controller 2.

Further, the detection lift pressure P is output from the lift L to the pitching controller 2.

Together with the above-described processing, the following processing is performed at the pitching controller 2.

First, as shown in FIG. 2, the detection lift pressure P is input to the vibration control unit 10.

The vibration control unit 10 selects any one of the optimal phase adjusting units 11-13 depending on the static loads of cargo at that time by using the input detection lift pressure P. Specifically, the LPF 14 outputs only a static component $P_{DC}$ of the detection lift pressure P. Then, the lift pressure determination unit 15 determines which load range the static component $P_{DC}$ which has passed through the LPF 14 falls under, that is, 25-50%, 50-75% or 75-100% of maximum static loads acting on the lift L. The selection unit 16 selects any one of the phase adjusting units 11-13 corresponding to the load range determined by the lift pressure determination unit 15.

Hereinafter, an explanation will be made for a case where the phase adjusting unit 12 is selected.

When the detection lift pressure P is input to the selected phase adjusting unit 12, the detection lift pressure P passes through the BPF 12a.

At this time, of the detection lift pressure P, a controlled frequency band of 3.5 Hz corresponding to 50-75% of maximum static loads is amplified and a phase thereof is also delayed at 90 degrees.

Where the BPF 12a is insufficient in phase adjustment, the time delay means 12b adjusts the phase on the basis of time.

The selection unit 16 outputs to the multiplier 17c the detection lift pressure P' which has been subjected to phase adjustment by the phase adjusting unit 12.

On the other hand, the gain coefficient correction unit 17b determines an optimal gain coefficient corresponding to the static component $P_{DC}$ input from the LPF 14 and corrects the gain coefficient of the amplifier 17a. The amplification unit 17 amplifies the detection lift pressure P' by the optimal gain coefficient at the multiplier 17c to generate a pitching control torque command $T^*_2$, thereby outputting the command to the dead zone element 20.

Where the input pitching control torque command $T^*_2$ is equal to or greater than a threshold value T', the dead zone element 20 outputs the pitching control torque command $T^*_2$ to the torque limiter unit 30. On the other hand, where the input pitching control torque command $T^*_2$ is less than the threshold value T', the dead zone element 20 does not output the pitching control torque command $T^*_2$ to the torque limiter unit 30 but cuts off the command.

Where the pitching control torque command $T^*_2$ is cut off, the wave pattern is made acute in angle.

The torque limiter unit 30 restricts the amplitude of the pitching control torque command $T^*_2$ to a predetermined range between a permissible maximum value up and a permissible minimum value lo. The permissible maximum value up and the permissible minimum value lo are set so as to be a positive value and a negative value of the extra torque determined by the extra torque computing means 32.

The limiter 31 cuts off a value exceeding the permissible maximum value up and a value smaller than the permissible minimum value lo, of pitching control torque command $T^*_2$ input from the dead zone element 20, and outputs to the load determination unit 40 a pitching control torque command $T^*_2$ in a range between the permissible maximum value up and the permissible minimum value lo.

Where the pitching control torque command $T^*_2$ is cut off, the wave pattern becomes acute in angle.

The load determination unit 40 outputs the pitching control torque command $T^*_2$ to the vehicle speed determination unit 50 on the condition that a static component $P_{DC}$ of the detection lift pressure P input from the LPF 14 is equal to or greater than 25% of maximum static loads of the lift L. Specifically, the load determination unit 40 multiplies the pitching control torque command $T^*_2$ by a variable d1 (0-1) and outputs the command to the vehicle speed determination unit 50.

The vehicle speed determination unit 50 outputs the pitching control torque command $T^*_2$ to the turning determination unit 60 on the condition that a vehicle-speed absolute value |U2| input from the vehicle-speed computing unit 80 is equal to or greater than 500 rpm of the motor rotation number. Specifically, the vehicle speed determination unit 50 multiplies the pitching control torque command $T^*_2$ by a variable 2 (0-1) and outputs the command to the turning determination unit 60.

The turning determination unit 60 outputs the pitching control torque command $T^*_2$ to the notch filter 70 on the condition that a turning amount |ΔU| is equal to or greater than 250 rmp. Specifically, the turning determination unit 60 multiplies the pitching control torque command $T^*_2$ by a variable d3 (0-1) and outputs the command to the notch filter 70.

Where the pitching control torque command $T^*_2$ contains a control unstable frequency, the notch filter 70 eliminates the control unstable frequency. That is, even if a wave pattern of the pitching control torque command $T^*_2$ becomes acute in angle by the dead zone element 20 and the torque limiter unit 30, the wave pattern is made smooth. As described above, the notch filter 70 outputs the pitching control torque command $T^*_2$.

The pitching control torque command $T^*_2$ is added to the motor control torque command $T^*_1$ at the second accumulator 400. Then, the torque command $T^*$, which is an additional value thereof, is input to the driving motors M ($M_R$, $M_L$).

Figure 4:
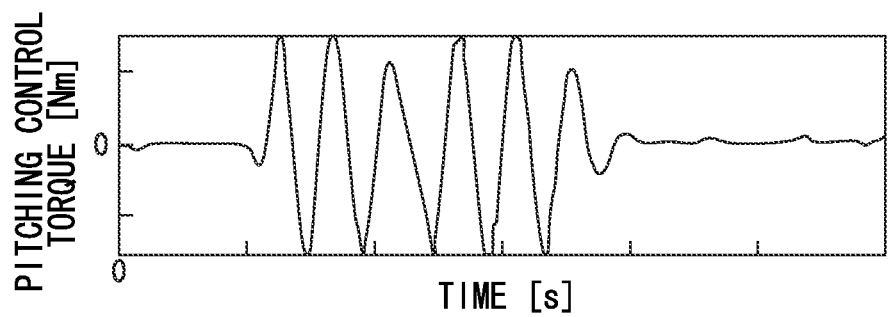
FIG. 4 is a graph which shows a relationship between a pitching control torque command $T^*_2$ and time according to the first embodiment of the present invention.
Figure 5:
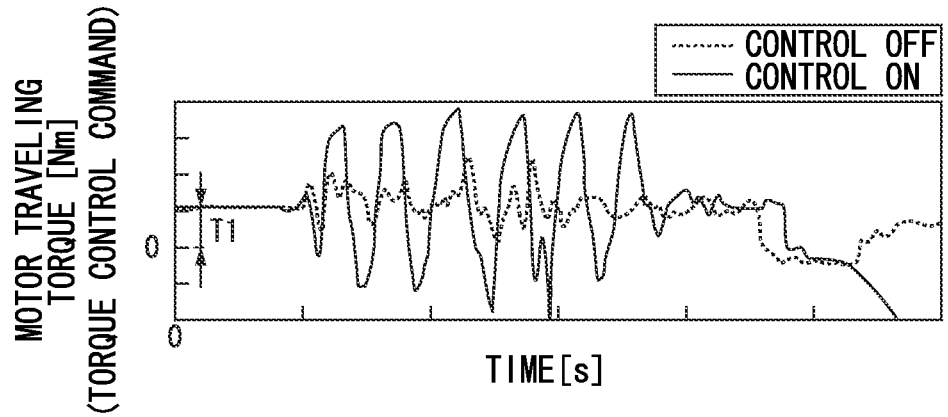
FIG. 5 is a graph which shows a relationship between a motor traveling torque (torque command T*) and time according to the first embodiment of the present invention.

FIG. 3 is a graph which shows a relationship between the detection lift pressure P and time. FIG. 4 is a graph which shows a relationship between the pitching control torque command $T^*_2$ and time. FIG. 5 is a graph which shows a relationship between the motor traveling torque (torque command $T^*$) and time. These graphs were prepared by allowing the forklift truck F to travel at 5 km/h and ride over a gap on the road, thereby causing pitching vibration.

As shown in FIG. 3, when pitching vibration takes place, a wave pattern of the detection lift pressure P is increased in amplitude.

At the same time, as shown in FIG. 4, a pitching control torque command $T^*_2$ in a direction of the amplitude which is an opposite direction of the wave pattern of the detection lift pressure P is generated. The pitching control torque command $T^*_2$ is generated so as to be a reverse wave pattern, the phase of which is shifted at 90 degrees from the wave pattern of pitching vibration.

The pitching control torque command $T^*_2$ is added to the motor control torque command $T^*_1(=T1)$, by which, as shown in FIG. 5, the wave pattern of the motor traveling torque (torque command T*) is made similar to that of the pitching control torque command $T^*_2$ in a state where only the motor control torque command $T^*_1(=T1)$ is offset.

As shown in FIG. 5, the motor traveling torque (torque command T*) is given as a sine wave, as with pitching vibration, and increased or decreased repeatedly on the basis of ΔT1 (motor control torque command $T^*_1$). In this case, in the vehicle main body C, when force resulting from pitching vibration acts from above to below at the center of the front axle shaft, torque from below to above is to act on the vehicle main body C, which is offset by the force resulting from pitching vibration. In contrast, when the force resulting from pitching vibration acts from above to below at the center of the front axle shaft, torque from above to below is to act on the vehicle main body C, which is offset by the force resulting from pitching vibration. In this case, since the motor traveling torque (torque command T*) is increased or decreased on the basis of the T1 (motor control torque command $T^*_1$), the forklift truck F is accelerated.

Thereafter, the pitching control torque command $T^*_2$ is decreased in amplitude accordingly as pitching vibration is damped. Additionally, when pitching vibration returns almost to its normal state, output of the pitching control torque command $T^*_2$ is zero. The motor traveling torque (torque command T*) is only an input portion of the motor control torque command $T^*_1(=T1)$ and kept constant again.

Here, time up to damping of pitching vibration is decreased to ⅓ as compared with a case where control of the pitching controller 2 is turned off.

As explained so far, according to the electric-vehicle control device 1, a controlled frequency band determined on the basis of frequencies of pitching vibration is set for the detection lift pressure P, and the filters 11a-13a designed so that a phase of the controlled frequency band is delayed at 90 degrees are also provided. Therefore, of the detection lift pressure P input as acceleration data of pitching vibration, the controlled frequency band is amplified and also subjected to phase adjustment. Thereby, speed data is generated as vibration parameters and subjected to velocity feedback.

Thereby, it is possible to obtain high damping effects on pitching vibration.

Further, since the motor traveling torque (torque command T*) is increased or decreased on the basis of the motor control torque command $T^*_1(=T1)$, the forklift truck F is accelerated and able to maintain the acceleration capability thereof.

It is, therefore, possible to obtain a high vibration damping rate and also maintain the acceleration capability.

Further, since being provided with the BPFs 11a to 13a, the electric-vehicle control device 1, which is relatively simple in constitution, is able to increase a gain of the controlled frequency band with respect to the detection lift pressure P and also make phase adjustment.

Further, since being provided with the time delay means 11b-13b, the electric-vehicle control device 1 is able to adjust a phase of the detection lift pressure P more accurately.

Further, since being provided with the three phase adjusting units 11-13 and also having the lift pressure determination unit 15 and the selection unit 16, the electric-vehicle control device 1 is able to optimize a controlled frequency band depending on static loads (static component $P_{DC}$) acting on the lift L. It is, thereby, possible to obtain appropriate damping effects corresponding to change in unique frequency of pitching vibration.

Further, since being provided with the gain coefficient correction unit 17b which changes a gain coefficient of the amplifier 17a depending on static loads (static component $P_{DC}$ of the detection lift pressure P) acting on the lift L, the electric-vehicle control device 1 is able to obtain an optimal pitching control torque command $T^*_2$, irrespective of the magnitude of static loads acting on the lift L, and also obtain appropriate damping effects.

Still further, since being provided with the dead zone element 20, the electric-vehicle control device 1 cuts off a pitching control torque command $T^*_2$ which is less than a threshold value and prevents the pitching control torque command $T^*_2$ from being output all the time regardless of the magnitude thereof. Thereby, no pitching control torque command $T^*_2$ is output for small pitching vibration which will not influence workability or interior comfort. It is, therefore, possible to suppress electric power consumption.

In addition, since being provided with the torque limiter unit 30 which restricts the amplitude of the pitching control torque command $T^*_2$ to a predetermined range, the electric-vehicle control device 1 is able to prevent the action of torque in excess of extra torque by a pitching control torque command $T^*_2$ and also able to increase the traveling stability.

In particular, while the forklift truck F moves forward by being accelerated, the torque command T* indicates a positive value. Additionally, absolute values up to the extra torque on the negative side are increased as compared with a value of the torque command T* and absolute values up to the extra torque on the positive side. That is, when reverse torque is allowed to act up to a limit of the extra torque on the negative side, there is a fear that excessive torque may act on a limit of the extra torque on the positive side to cause a traveling state that brakes are suddenly applied intermittently. However, a permissible minimum value lo of the pitching control torque command $T^*_2$ is set to the extra torque, by which maximum values of amplitude both on the positive side and the negative side can be made substantially equal. Therefore, it is possible to prevent the above-described unstable traveling state.

Further, since being provided with the load determination unit 40, the electric-vehicle control device 1 will not output the pitching control torque command $T^*_2$ where action of static component $P_{DC}$ equal to or greater than a predetermined threshold value is not in progress. Thereby, under the condition that a static component $P_{DC}$ of the detection lift pressure P is relatively small and pitching vibration is less likely to take place, it is possible to prevent the output of the pitching control torque command $T^*_2$. It is, thus, possible to suppress electric power consumption.

Still further, the load variable map indicates an easement curve. Therefore, the output of the pitching control torque command $T^*_2$ can be decreased gradually where the vehicle speed is in the vicinity of a predetermined threshold value (0<d1<l). Thereby, the pitching control torque command $T^*_2$ is prevented from being output rapidly, and the forklift truck F can be improved in traveling stability.

Further, since being provided with the vehicle speed determination unit 50, the electric-vehicle control device 1 will not output the pitching control torque command $T^*_2$ where a vehicle-speed absolute value |U2| of the vehicle main body C is not equal to or greater than a predetermined threshold value. Thereby, it is possible to prevent the pitching control torque command $T^*_2$ from being output under the condition that pitching vibration is less likely to take place, for example, in a case where the vehicle main body C is relatively small in vehicle speed. It is, therefore, possible to suppress electric power consumption.

Still further, the vehicle speed variable map indicates an easement curve. Therefore, it is possible to gradually decrease the output of the pitching control torque command $T^*_2$ where the vehicle speed is in the vicinity of a predetermined threshold value (0<d2<1). It is, thereby, possible to improve the traveling stability.

Further, since being provided with the turning determination unit 60, the electric-vehicle control device 1 will not output the pitching control torque command $T^*_2$ where a turning amount |ΔU| of the vehicle main body C is less than a predetermined threshold value. Thereby, it is possible to prevent the pitching control torque command $T^*_2$ from being output under the condition that pitching vibration is less likely to take place, for example, in a case where a turning amount |ΔU| of the vehicle main body C is relatively small. It is, thereby, possible to suppress electric power consumption.

Still further, the turning variable map indicates an easement curve. Therefore, it is possible to gradually decrease the output of the pitching control torque command $T^*_2$ where a turning absolute value |ΔU| is in the vicinity of a predetermined threshold value. It is, thereby, possible to improve the traveling stability.

Further, since being provided with the notch filter 70, the electric-vehicle control device 1 eliminates a control unstable frequency, that is, a specific frequency at which the driving motors M may be unstably controlled, thus making it possible to increase the control stability.

Still further, in place of the notch filter 70, a low-pass filter which will not influence a phase of the controlled frequency band may be used. Thereby, it is possible to smooth a wave pattern which is acute in angle.

Further, since being provided with any one of the above-described electric-vehicle control devices 1, the forklift truck F is able to obtain a high vibration damping rate and also improve the riding comfort and operational performance, if pitching vibration takes place.

In particular on a road surface great in irregularity to cause pitching vibration easily, the forklift truck F is unable to travel at high speeds but travels at a low speed range of the vehicle speed (0-15 km/h (preferably 0-8 km/h)). Therefore, the driving motor M is relatively great in extra torque and the great extra torque can be used. Thereby, pitching vibration can be reduced only by adding the pitching controller 2 to a control device of an existing forklift truck F.

Where pitching vibration of the forklift truck F is relatively low in frequency, for example, about 2-3 Hz, the driving motor M can be followed easily.

The three phase adjusting units 11-13 are provided in the present embodiment. However, they may be constituted so that only one phase adjusting unit is provided.

Further, the three phase adjusting units 11-13 are constituted respectively with the BPF 11a-13a and the time delay means 11b-13b. However, they may be constituted with only the BPF 11a-13a. Still further, the BPF 11a-13a may be constituted by combining HPFs (high pass filters) with LPFs.

Further, in the present embodiment, the skyhook control theory is used to design the filters 11a-13a. Various control theories such as H∞ control and optimal control may be applied to the pitching controller 2, by which the filters may be designed so as to be in conformity with these control systems (design of control system).

Further, in the present embodiment, the three phase adjusting units 11-13 are provided, and the lift pressure determination unit 15 and the selection unit 16 are also provided, by which a controlled frequency band is made variable. The controlled frequency band may be changed more elaborately by providing a greater number of units. Still further, a variable filter or the like may be used to change the controlled frequency band continuously.

Further, in the present embodiment, the detection lift pressure P is used as acceleration data. However, for example, a strain gauge may be installed on a supporting unit of the lift L to obtain the acceleration data, or an accelerometer is installed on cargo or the lift to obtain the acceleration data.

Further, in the present embodiment, a controlled frequency band of each of the phase adjusting units 11-13 is set, with a target given to a frequency (2-3 Hz) of pitching vibration mainly on the front axle shaft. However, a controlled frequency band of each of the phase adjusting units 11-13 may be set, with a target given to a frequency (4-6 Hz) of pitching vibration mainly on the rear axle shaft.

Further, in the present embodiment, no particular description has been made for types of driving motors. However, for example, an alternating-current motor or a direct-current motor may be used. Still further, the alternating-current motor may include an induction motor and a synchronous motor.

If filters are designed only for pitching vibration on the vehicle body which is relatively low in frequency (up to 10 Hz), an induction motor poor in response may be used.

Further, in the present embodiment, the present invention has been applied to the forklift truck F with two driving motors M ($M_R$, $M_L$). However, the present invention may be applied to a forklift truck with only one driving motor M.

Further, in the present embodiment, the electric-vehicle control device 1 according to the present invention is used in the forklift truck F as an electric vehicle. However, the electric-vehicle control device 1 according to the present invention is also applicable to passenger vehicles and others, if they are electric vehicles.

Further, in the present embodiment, acceleration data is used as kinetic parameters of the forklift truck F and speed data obtained by subjecting the acceleration data to phase adjustment is used as vibration parameters. However, the following constitution is also acceptable.

That is, displacement data is used as kinetic parameters of an electric vehicle, and a controlled frequency band of the displacement data is subjected to differential operation or phase adjustment to determine speed data, and then, the speed data may be used as vibration parameters. The displacement data can be determined, for example, by installing a displacement gauge on a supporting unit of the lift L.

Still further, the speed data may be used as kinetic parameters of an electric vehicle and the controlled frequency band of the speed data may be used as vibration parameters. The speed data may be determined, for example, by installing a speed sensor on the lift L or cargo or the motor rotation number co may be used.

In addition, in the present embodiment, where a turning amount |ΔU| is equal to or greater than a threshold value, the output of the pitching control torque command $T^*_2$ is to be zero. However, where no threshold value is set in the turning amount |ΔU| or where the threshold value of the turning amount |ΔU| is set to be relatively great, the pitching control torque command $T^*_2$ is allowed to contain information on distribution of the motor rotation number and may be distributed to the motor traveling torque of the driving motors $M_R$, $M_L$.

Second Embodiment

Figure 6:
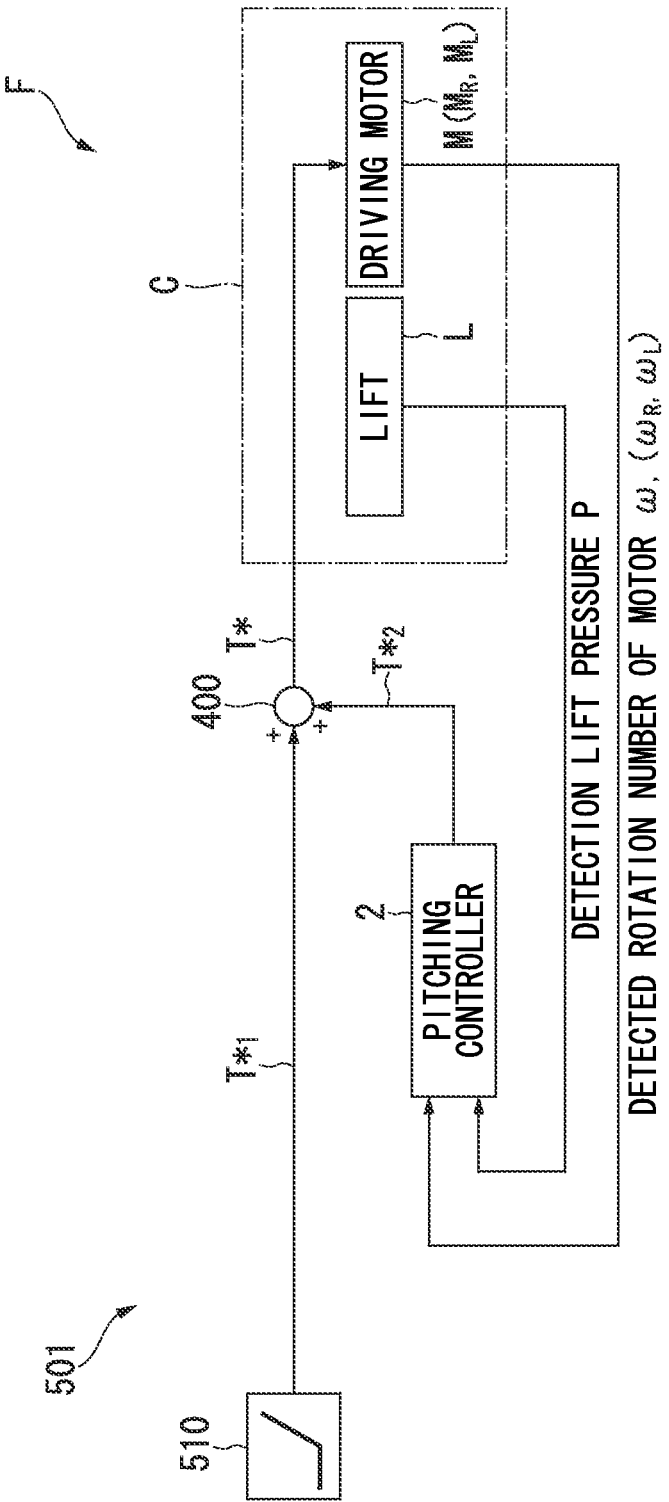
FIG. 6 is a block diagram which shows an entire constitution of an electric-vehicle control device 501 which is a second embodiment of the present invention.

FIG. 6 is a block diagram which shows an entire constitution of an electric-vehicle control device 501 which is a second embodiment of the present invention. In FIG. 6, constituents similar to those of FIG. 1 to FIG. 5 are given the same reference numerals, with an explanation omitted here.

In the electric-vehicle control device 1 of the above-described first embodiment, the speed control (control of the motor rotation number) is adopted to control the travel of the vehicle main body C. However, in the present embodiment, torque control is used.

The electric-vehicle control device 501 is provided with an accelerator input processing unit 510, a second accumulator 400 and a pitching controller 2, and constituted so as to control the travel of the vehicle main body C by torque control.

That is, the accelerator input processing unit 510 is constituted in a manner that a motor control torque command $T^*_1$ is output to the second accumulator 400 depending on a depression amount of the accelerator. The motor control torque command $T^*_1$ is added to a pitching control torque command $T^*_2$, by which the present invention can be applied to the torque control.

This constitution is also able to obtain the effects similar to those of the above-described first embodiment.

Third Embodiment

Figure 7:
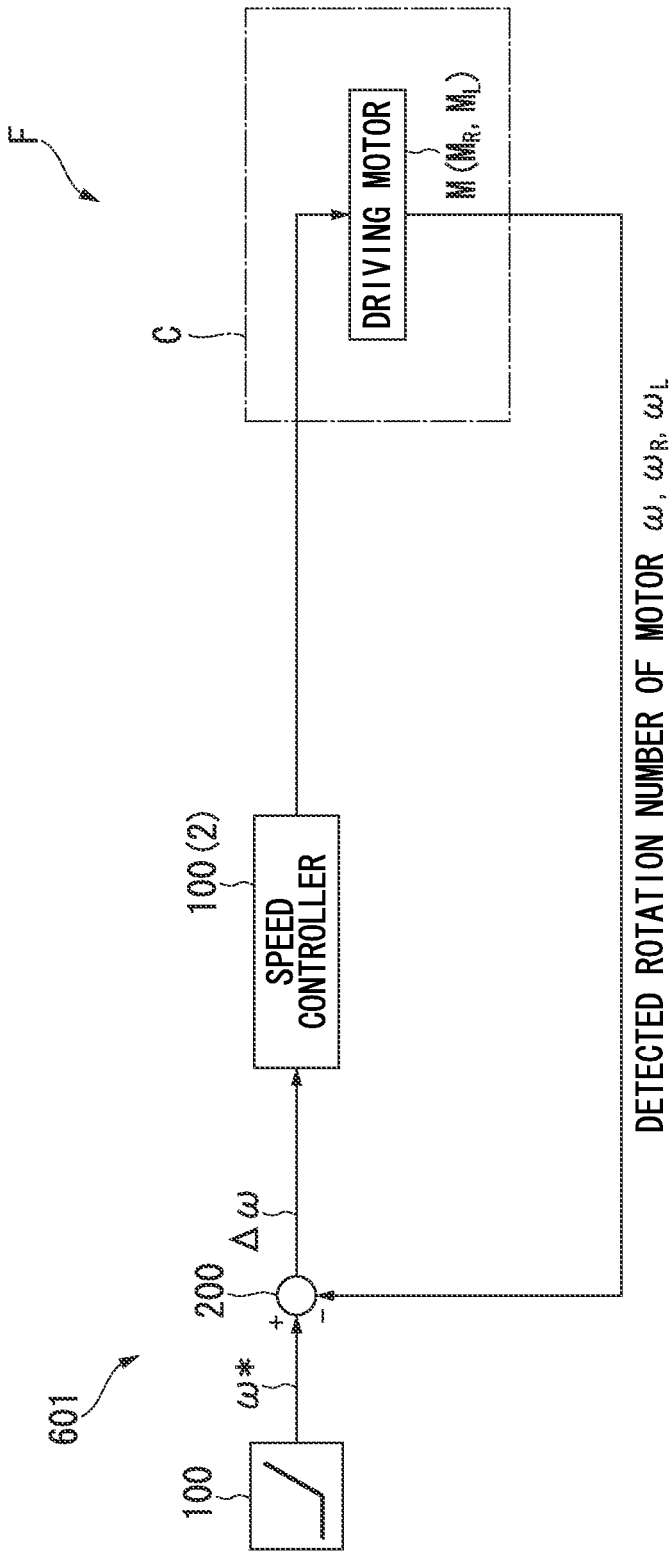
FIG. 7 is a block diagram which shows an entire constitution of an electric-vehicle control device 601 according to a third embodiment of the present invention.

FIG. 7 is a block diagram which shows an entire constitution of an electric-vehicle control device 601 which is a third embodiment of the present invention.

In FIG. 7, constituents similar to those of FIG. 1 to FIG. 6 are given the same reference numerals, with an explanation omitted here.

As shown in FIG. 7, the pitching controller 2 is directly assembled into the speed controller 100 which is installed at a feedback loop on the motor rotation number.

In this case, kinetic parameters are given as the detected rotation number of a motor ω, and vibration parameters are speed data based on the detected rotation number of a motor w.

This constitution is also able to obtain the effects similar to those of the above-described embodiments.

Parameters, operational procedures and various shapes of individual members and combinations described in the above embodiments are only examples, and they may be changed in various ways based on design requirements, and so on, in a range not departing from the scope of the present invention.

The present invention shall not be restricted to the above-described embodiments and may be modified or changed whenever necessary in a range not departing from the scope of the present invention.

INDUSTRIAL APPLICABILITY

The present invention is applicable to control of an electric vehicle which is provided with a vehicle body having a driving tire and an axle shaft and also with a driving motor which imparts toque to the driving tire.

REFERENCE SYMBOLS 1, 501, 601: Electric-vehicle control device
2: Pitching controller
10: Vibration control unit
11-13: Phase adjusting unit
11a-13a: Filter
11b: Time delay means
17: Amplification unit
20: Dead zone element
30: Torque limiter unit
31: Limiter
32: Extra torque computing means
40: Load determination unit
50: Vehicle speed determination unit
60: Turning determination unit
70: Notch filter (unstable component eliminating filter)
80: Vehicle speed computing unit
90: Turning amount computing unit
C: Vehicle main body
L: Lift
M ($M_L$, $M_R$): Driving motor
P: Detection lift pressure (kinetic parameters, acceleration data)
$T^*$: Torque command (motor control command)
$T^*_1$: Motor control torque command (motor control command)
$T^*_2$: Pitching control torque command (vibration control command)
F: Forklift truck (electric vehicle)
$P_{DC}$: Static component

The invention claimed is:

1. An electric-vehicle control device which is used in an electric vehicle, the electric vehicle including a vehicle body and at least one driving motor, the vehicle body having at least one driving tire and at least one axle shaft, the at least one driving motor imparting torque to the at least one driving tire, the electric-vehicle control device issuing a motor control command to the at least one driving motor, the electric-vehicle control device comprising:
a control unit configured to generate a first wave pattern, the first wave pattern being a reverse wave pattern of a second wave pattern, a first phase of the first wave pattern being shifted at 90 degrees from a second phase of the second wave pattern, the second wave pattern being of vibration parameters indicating vertical vibration of the electric vehicle at the center of the at least one axle shaft;
an extra torque computing unit configured to determine extra torque of the at least one driving motor; and
a limiter configured to generate a third wave pattern by restricting an amplitude of the first wave pattern to a predetermined range, the restriction being performed based on the extra torque determined by the extra torque computing unit,
wherein the control unit is configured to perform a feedback control of the at least one driving motor by adding the third wave pattern generated by the limiter to the motor control command, and
wherein at least one of the first phase and the second phase is adjusted based on a controlled frequency band corresponding to static loads acting on the electric vehicle.

2. The electric-vehicle control device according to claim 1, the electric-vehicle control device further comprising:
a vibration control unit configured to generate a vibration control command to be added to the motor control command from the vibration parameters.

3. The electric-vehicle control device according to claim 2, wherein the vibration control unit is provided with a filter to which kinetic parameters of the electric vehicle including the vibration parameters are input, and
the filter is configured to set the controlled frequency band on the basis of a frequency of the vertical vibration to detect the vibration parameters from the input kinetic parameters.

4. The electric-vehicle control device according to claim 3, wherein the kinetic parameters are acceleration data of the electric vehicle, and the vibration control unit is configured to use the filter to give phase adjustment to the acceleration data of the controlled frequency band, thereby obtaining speed data which serves as the vibration parameters.

5. The electric-vehicle control device according to claim 3, wherein the vibration control unit further comprises a time delay unit configured to give phase adjustment for output of the filter time-delayed.

6. The electric-vehicle control device according to claim 3, wherein the vibration control unit is configured to change the controlled frequency band by static loads acting on the electric vehicle.

7. The electric-vehicle control device according to claim 2, wherein the vibration control unit further comprises an amplification unit configured to change a gain coefficient with respect to the vibration parameters by static loads acting on the electric vehicle.

8. The electric-vehicle control device according to claim 2, the electric-vehicle further comprising:
a dead zone element configured to allow the vibration control command to pass through on the condition that the vibration control command is equal to or greater than a predetermined threshold value.

9. The electric-vehicle control device according to claim 2, the electric-vehicle control device further comprising:
a load determination unit configured to allow the vibration control command to pass through on the condition that static loads acting on the electric vehicle are equal to or greater than a predetermined threshold value.

10. The electric-vehicle control device according to claim 2, the electric-vehicle control device further comprising:
a vehicle speed determination unit configured to allow the vibration control command to pass through on the condition that the vehicle speed of the electric vehicle is equal to or greater than a predetermined threshold value.

11. The electric-vehicle control device according to claim 2, the electric-vehicle control device further comprising:
a plurality of driving motors including the at least one driving motor; and
a driving motor rotation number determination unit configured to allow the vibration control command to pass through on the condition that an absolute value of a static component of a deviation between rotation numbers of the plurality of the driving motors is equal to or greater than a predetermined threshold value.

12. The electric-vehicle control device according to claim 2, the electric-vehicle control device further comprising:
an unstable component eliminating filter configured to eliminate a control unstable frequency of the vibration control command.

13. The electric-vehicle control device according to claim 2, the electric-vehicle control device further comprising:
a phase adjusting unit at a feedback loop based on the rotation number of the at least one driving motor.

14. The electric-vehicle control device according to claim 1,
wherein the limiter stores a permissible maximum value and a permissible minimum value of the first wave pattern, and
the limiter is configured to use, as the predetermined range, a range determined by the permissible maximum value and the permissible minimum value.

15. The electric-vehicle control device according to claim 14,
wherein the limiter stores, as the permissible maximum value, a positive value of the extra torque determined by the extra torque computing unit, and stores, as the permissible minimum value, a negative value of the extra torque determined by the extra torque computing unit.

16. The electric-vehicle control device according to claim 1,
wherein the extra torque computing unit is configured to determine the extra torque by subtracting a first torque from a second torque, the first torque being that the at least one driving motor is currently outputting, the second torque being that the at least one driving motor can output at a maximum.

17. An electric vehicle, comprising:
a vehicle body including at least one driving tire and at least one axle shaft;
the at least one driving motor configured to impart torque to the at least one driving tire; and
the electric-vehicle control device according to claim 1.

18. A forklift truck, comprising:
a vehicle body including at least one driving tire and at least one axle shaft;
at least one driving motor configured to impart torque to the at least one driving tire;
a lift; and
the electric-vehicle control device according to claim 3.

19. The forklift truck according to claim 18, wherein the kinetic parameters are acceleration data of the electric vehicle and lift pressure acting on the lift is input to the filter as the acceleration data.

* * * * *